Oct. 28, 1941.　　　A. P. FALL　　　2,260,612
COMPOSITE PISTON RING
Filed Feb. 2, 1938　　　3 Sheets-Sheet 1
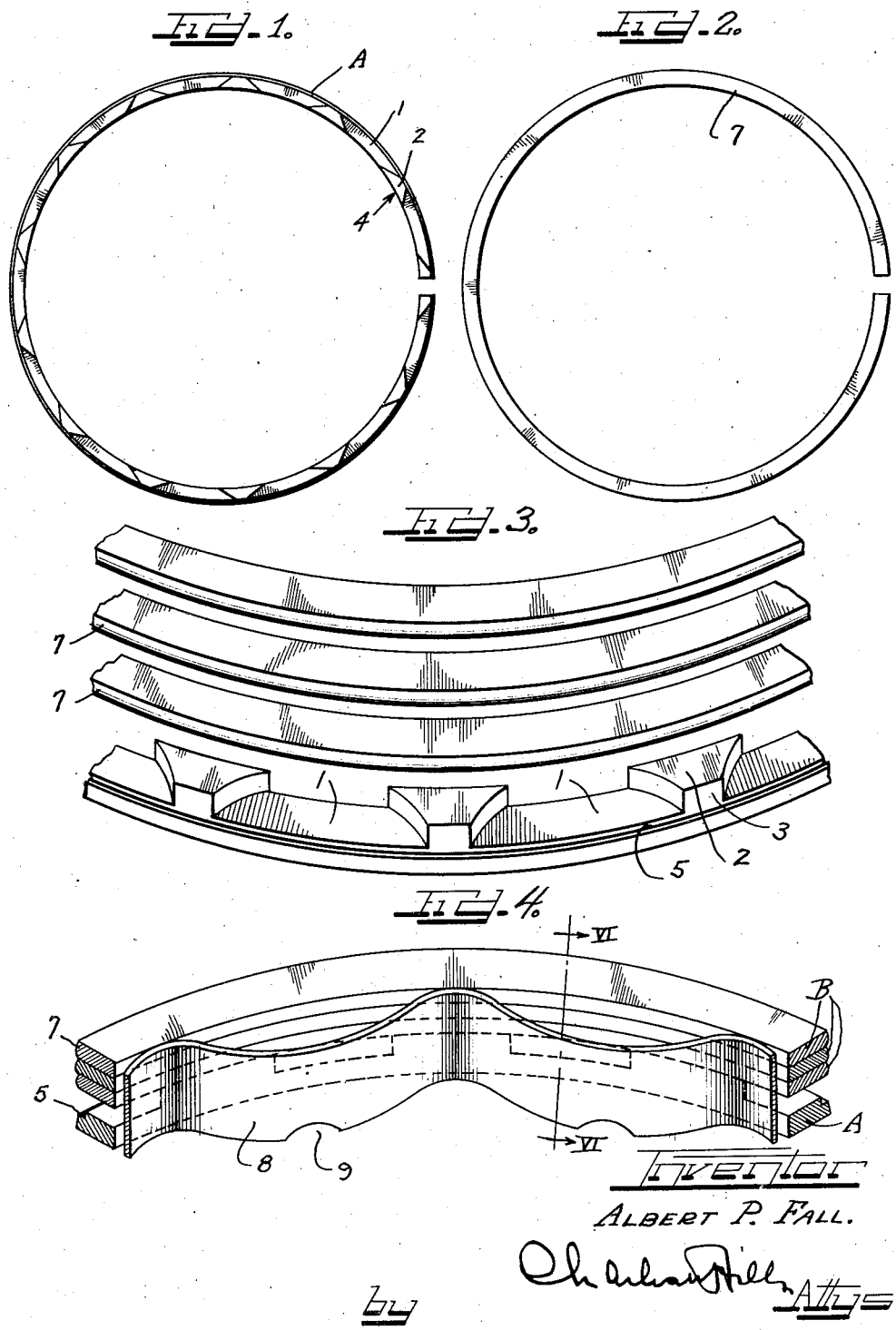
Inventor
ALBERT P. FALL.
by Oct. 28, 1941.  A. P. FALL  2,260,612
COMPOSITE PISTON RING
Filed Feb. 2, 1938   3 Sheets-Sheet 2
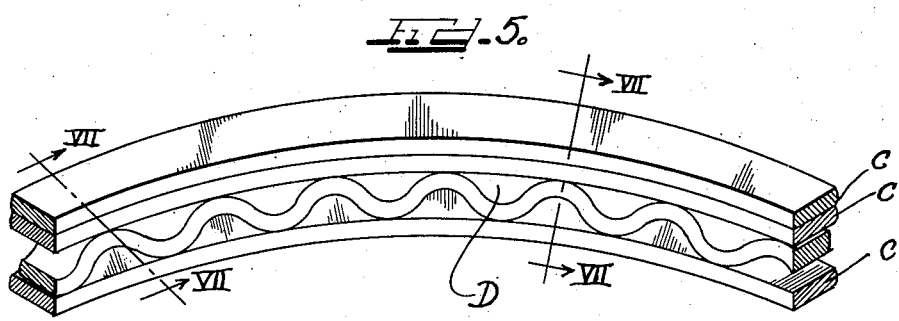
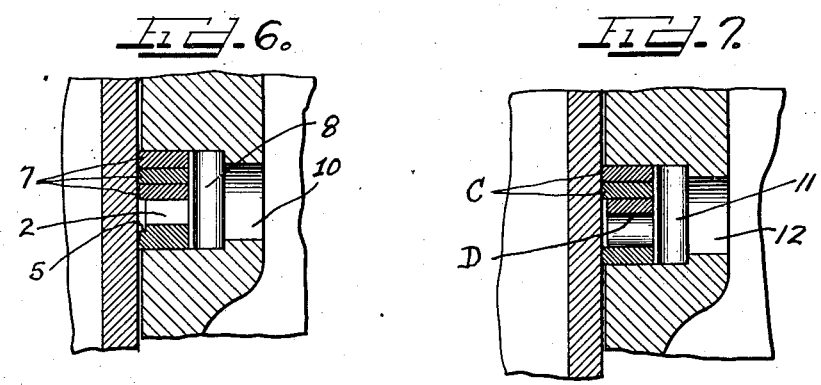
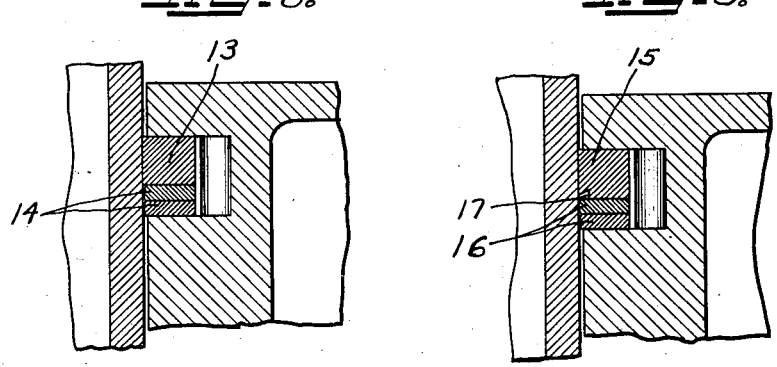
Inventor
ALBERT P. FALL.
by Charles N. Hill Attys.

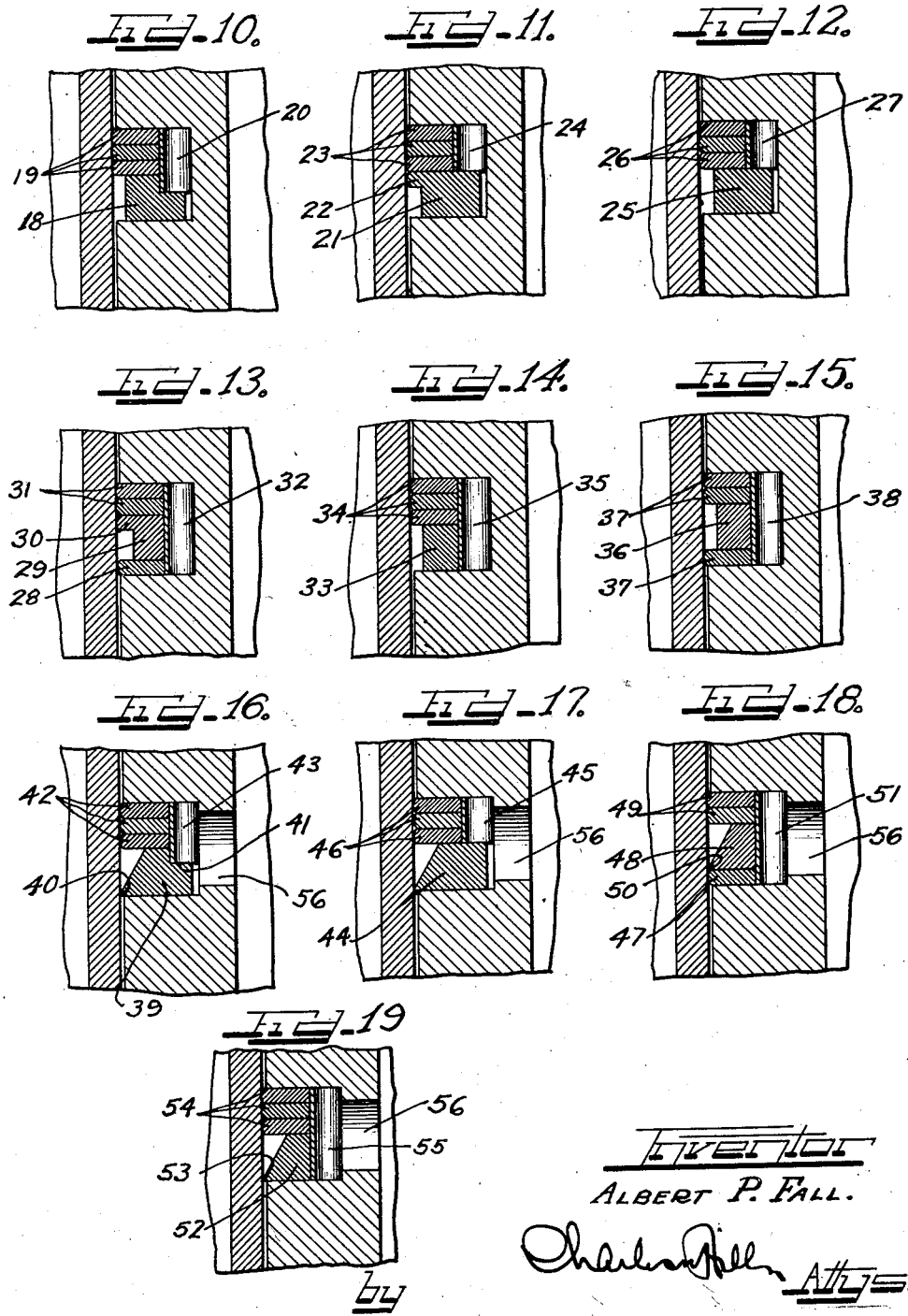

Patented Oct. 28, 1941

2,260,612

UNITED STATES PATENT OFFICE 2,260,612

COMPOSITE PISTON RING

Albert P. Fall, Toledo, Ohio

Application February 2, 1938, Serial No. 188,266

2 Claims. (Cl. 309—45)

The present invention relates to composite piston rings comprising sections of different axial thicknesses.

An object of the present invention is to provide a composite piston ring made up of two or more sections arranged in superimposed position for disposition in the ring grooves of the pistons.

Another object of the present invention is to provide composite piston rings wherein the axial thickness of one section of the ring is a multiple of the axial thickness of another section of the ring.

A further object of the present invention is to provide a composite piston ring utilizing one axially thick section of iron and at least one axially thin section of steel.

A further object of the present invention is to provide a composite piston ring having sections possessing different metallurgical characteristics.

A still further object of the present invention is to provide a composite piston ring and expander assembly with at least one of the ring sections more responsive to expander action than another.

This invention has for a further object the provision of a composite oil drain ring having an axially thick section which is slotted to provide a plurality of circumferentially spaced oil passages, and which passages are opened through one face of the section, and a thin section against said one face to bridge the passages.

Another and yet further object of the present invention is to provide a composite oil drain piston ring comprising at least one axially thin and radially flexible section and a wavy separator section which is circumferentially flexible and radially relative rigid and in which the axial distance between the planes of the crests of the wavy section is a multiple of the axial thickness of the thin section.

The invention has for an additional object, the provision of a composite piston ring, formed with at least one thin section and one thick section, the thick section being more resistant to high temperatures, and the thin section being more readily responsive to expander action thereby conforming to cylinders which are notably out of round or of other shape than truly cylindrical.

A further object of the present invention is to provide a composite piston ring construction built to withstand the heat of combustion and to provide more efficient compression in worn cylinders.

Generally speaking, the composite piston ring of the present invention may be made in various forms. One form may take that of a thick section and a thin section, the thick section being two or three times the thickness of the thin section. Again, the so-called thick section may consist of a wavy section, the distance between the planes of the crests of the section being a multiple of the thickness of a thin section or of thin sections used with the wavy section, the multiple being twice or three times that of a cooperative thin section.

Again the thick section may be slotted for oil drain purposes and the slots opening through one surface of the ring, and with a maximum thickness of the thick section, that is through the bridge portions between the slots being substantially twice or three times that of a thin section used with a thick section.

The above, other, and further objects of the present invention will be readily apparent from the following description and accompanying drawings.

The accompanying drawings illustrate various modifications and embodiments of the present invention and the views thereof are as follows:

Figure 1 is a top plan view of a slotted or notched oil drain section of a composite ring of the present invention.

Figure 2 is a plan view of a radially expansible split thin section for cooperative use with the section of Figure 1.

Figure 3 is a fragmental isometric view of a composite piston ring, of the oil drain type, made up of the thin section of Figure 1 and three thin sections of the form of Figure 2, showing these various sections in spaced positions for the sake of clearness.

Figure 4 is a fragmental isometric view showing a composite ring of the form described with reference to Figure 3, with the sections together and an expander in place behind the sections and showing the relative relationship of the various elements entering into the composite ring.

Figure 5 is a fragmental isometric view of another form of composite ring wherein a wavy section is utilized to space superimposed thin sections, the wavy section constituting oil passageways through the ring.

Figure 6 is a fragmental vertical or axial sectional view through a portion of a cylinder and piston and through an oil drain ring of the type of Figures 1 to 4 inclusive taken substantially in the plane indicated by line VI—VI of Figure 4.

Figure 7 is a fragmental axial sectional view showing a portion of a cylinder, a portion of a piston, and an oil drain ring of the type of Figure 5, taken substantially in the plane indicated by line VII—VII of Figure 5.

Figure 8 is a similar view showing a compression ring of the present invention of the type which is installed in the first or upper ring groove of a piston, with an expander between the composite ring and the bottom of the groove.

Figure 9 is a view similar to Figure 8, with the thick section of the ring provided with an under cut lip for scraping of oil on downstroke.

Figures 10 to 19 inclusive are similar views showing the different arrangements of thin and thick sections, all constructed in accordance with the principles of the present invention, and in which the thick sections are made as multiples of the thicknesses of the thin sections, and in all of these views expanders are utilized between the inner peripheries of the rings and the bottoms of the ring grooves.

The drawings will now be explained.

The composite ring illustrated in Figures 1 to 4 inclusive includes a thick section A and three thin sections B.

The thickness of the sections herein mentioned, refers to axial thickness.

The ring illustrated in Figures 3 and 4 is adapted to be used in a ring groove in which the oil drain ring is installed.

The lowermost section A has a plurality of slots 1 formed in it by any suitable tool, or in any suitable manner, preferably by utilizing a circular saw. Slots 1 extend through from the outer to the inner periphery of the ring and are open through the top face of the ring or section. Slots are separated by bridge portions 2 which, in plan, appear as truncated triangles with the front faces of such bridge portions at 3 of less peripheral extent than the rear portions 4. In forming the thick section A, a lip 5 is cut or otherwise formed in the ring below the surfaces of the slots, which lip serves, when the ring is installed in a piston, and a piston in a cylinder, as an oil pocket to accumulate oil on upstroke of the piston.

The thin sections B as well as the thick section A are split in the usual manner, and the thin sections have their outer peripheries slightly rounded as at 7 to provide a plurality of scraping surfaces for the composite rings.

When assembling the composite ring of Figures 1 to 4, in a piston for use in an out-of-round or worn cylinder, an expander 8 is employed, which is installed between the bottom of the piston ring groove in the piston and the inner peripheries of the ring sections. Preferably the expander is notched as at 9 to afford oil passageway from the piston ring groove through usual holes in the piston to the interior of the piston.

The axial thickness of the thick section A is herein illustrated as a multiple of the thickness of any of the thin sections B, being illustrated as approximately 3 to 1.

It is to be understood that the axial thickness of the thick section A might be in a ratio other than 3 to 1, as it has been found that a ratio of 2 to 1 works as satisfactorily. In any event, thickness of the thin section is constructed as a multiple of the thickness of a thin section with which it cooperates to provide a composite piston ring.

In manufacture, the thin sections are made of $\frac{3}{32}$ of an inch in thickness in which event the thick section A would be $\frac{3}{32}$ in axial thickness.

If the ratio were 2 to 1 then the thickness of the thick section would be $\frac{1}{8}$ of an inch.

With the thick section A of $\frac{3}{32}$ thickness and the thin sections B of $\frac{1}{32}$ thickness apiece, then the thick section A and three thin sections B would be installed in a piston ring groove of $\frac{3}{16}$" size. If the groove is $\frac{5}{32}$ then but two of the thin sections B would be used.

Figure 6 is a section through the ring of Figure 4 as the same appears installed in a groove in a piston and shows the engagement of the various sections with the cylinder wall under influence of the expander 8. The oil drain openings between the piston ring groove and the interior of the pistons appear at 10.

The oil drain ring illustrated in Figures 5 and 7 consists, as are shown, of three sections C and a wavy section D. The thin sections C have their outer peripheries rounded, as described with reference to the sections B and when installed in a piston ring groove the rounded peripheries of these sections bear against the cylinder walls so as to afford increased scraping edges in use.

The wavy section D is resilient vertically and substantially rigid radially. It may be formed from a section of substantially the same thickness as the thin sections B or otherwise. As the wavy section D is constructed the planes of its crests are separated, axially, a distance, which is a multiple of the thickness of the thin sections C, the wavy section D illustrated in Figures 5 and 7 showing a ratio of 3 to 1, although it might be two to one if so desired.

In radial dimensions the wavy section is slightly less in width than the widths of the thin section C so that the outer periphery of the wavy section will lie out of contact with the cylinder wall, as may be readily observed in Figure 7.

In applying such ring to a piston for use in an out-of-round cylinder, an expander 11 is employed which may be of the same construction as the expander 8, or otherwise, and the piston is provided with oil drain openings 12 so that surplus oil may drain back into the crankcase, as is common practice.

It is, of course, understood that the rings of Figures 1 to 7 inclusive, are oil drain rings, and therefore are installed in the lowermost grooves of the pistons as is customary for installation of oil drain rings.

The rings illustrated in Figures 8 and 9 are compression rings, and are installed in the uppermost or first ring groove of a piston.

The composite ring structure illustrated in Figure 8 includes a thick section 13 and two thin sections 14. The thin sections 14 are of the same thickness, while the thick section is made as a multiple of the thickness of one of the thin sections 14.

The thick section 13 is shown substantially three times that of a thin section 14, although of course it could be the ratio of 2 to 1, in which event another thin section would be employed in the groove of the size there shown.

The compression ring shown in Figure 9 includes a thick section 15 and two thin sections 16, the section 15 being substantially three times the thickness of one of the thin sections 16. In the thick section 15, there is formed an undercut groove 17, constituting an oil pocket and lip, for scraping oil from the cylinder walls on downstroke.

The forms of composite rings illustrated in

Figures 10 to 19 inclusive employ thick sections and thin sections, in which the piston ring grooves are of 1/16" size. The thick sections are substantially 3/32" thick while every one of the thin sections is 1/32 of an inch thick.

The composite ring illustrated in Figure 10 has a thick section 18 which is L shaped in section and arranged so that the outer periphery of the ring is out of contact with the cylinder walls. Above the thick section are installed three thin sections 19 whose outer peripheries contact the cylinder walls. An expander 20 is installed behind the thin sections 19 and rests on a ledge formed by a rearwardly projecting flange of the thick section 18. The expander urges the thin sections 19 outwardly and because of the resiliency of these sections, the sections follow closely the contour of the cylinder walls, and especially where the cylinder wall is out-of-round the flexibility of the thin sections is such that an efficient oil seal is provided preventing passage of oil past the composite piston ring. This composite ring is of the oil compression type and may be used in the first or second grooves of the piston.

The thick section 21 of the arrangement of Figure 11 is formed with an outwardly projecting upper flange 22 whose outer face is rounded to provide a scraping edge against the cylinder wall. Above the thick sections are a plurality of thin sections 23, and behind the thin sections, and resting on top of the thick sections, is an expander 24 which urges the thin sections outwardly against the cylinder wall, and, because of the flexibility of the thin sections, afford an efficient seal against oil escape past the ring.

The composite ring of Figure 12 has a thick section 25 of rectangular cross-section, arranged with its outer face spaced from the cylinder wall. On top of the thick section are thin sections 26 whose outer peripheries are rounded to provide scraping edges against the cylinder walls. An expander 27 is installed behind the thin sections and resting on top of the thick section 25.

The ring of Figure 13 has a thin section 28 against the bottom wall of the groove, a thick section 29 having an outwardly extending upper flange 30 to bear against the cylinder wall. On top of the thick section are thin sections 31 with their outer peripheries against the cylinder wall. An expander 32 is installed behind all of the sections of this form of ring to urge the sections outwardly against the cylinder wall for effecting tight sealing between the composite ring and the cylinder wall.

The composite ring illustrated in Figure 14 employs a thick section 33 resting against the lower wall of the groove, with thin sections 34 on top of it. The outer periphery of thick section 33 is spaced inwardly from the cylinder wall while the outer peripheries of the thin sections 34 bear against the wall in the usual manner. An expander 35 is interposed between the inner peripheries of the sections and the bottom of the ring grooves and acts to force the thin sections 34 into tight engagement with the cylinder walls to prevent oil escape and to effect a tight seal between the composite ring and cylinder wall.

The composite ring structure of Figure 15 utilizes a thin section 37 against the lower wall of the grooves, a thick section 36 on top of the thin section 37, which thick section has its outer periphery spaced inwardly from the cylinder wall to be out of contact with respect to the wall. On top of the thick section are thin sections 37 whose outer peripheries contact the cylinder wall as shown. An expander 38 is utilized and interposed against the inner peripheries of all of the sections of this form of composite ring. The expander functions to force the thin sections 37 against the cylinder wall to effect a tight seal and prevent oil escape.

The composite ring of Figure 16 has a thick section 39 against the lower wall of the ring groove. The front face of this thick section is inclined rearwardly to provide a sharp scraping edge at 40 that contacts with the cylinder wall. The section is notched rearwardly as at 41. On top of the thick section are thin sections 42 whose outer peripheries bear against the cylinder wall and are maintained in sealing relationship by means of an expander 43 which rests in a notch 41 of the thick section. The expander 43 functions also to urge the thick section 39 against the cylinder wall. This type of ring is a compression ring and is provided with increased facilities for scavenging oil from the cylinder wall.

The composite ring structure of Figure 17 is somewhat similar to that of Figure 16, except that there is no notch formed in the thick section 44 and expander 45 rests on top of the thick section. On top of the thick section also are thin sections 46 whose outer peripheries contact the cylinder wall and maintained thereagainst by action of the expander 45.

The composite ring structure of Figure 18 includes a thin section 47 against the lower wall of the groove, a thick section 48 on top of the thin section 47, and thin sections 49 on top of the thick section. The front face of the thick section is inclined rearwardly and upwardly to provide a sharp scraping edge 50 at the lower margin of the thick section. An expander 51 is inserted between the inner peripheries of the sections and the bottom of the ring groove and acts to urge all of the sections against the cylinder wall.

The ring structure of Figure 19 includes a thick section 52 against the lower wall of the groove, which section has its outer periphery inclined upwardly and rearwardly to provide a sharp scraping edge 53. Thin sections 54 are mounted on top of the thick section 53 and are urged against the cylinder wall by means of an expander 55 which also bears against the inner periphery of the thick section 52.

The composite rings shown in Figures 16 to 19 inclusive appear as oil drain rings, the pistons being provided with oil drain passages 56. In order to permit seepage of oil into the passages 56, the thick sections may be slotted, as illustrated in Section A of Figures 1, 3, and 4 so that oil may pass from the exterior surface of the rings into the oil drain openings 56 thence to the crankcase.

The composite rings of the present invention lend themselves very readily to installation in worn internal combustion engines, especially engines which are oil pumpers.

In action, the thick sections, are made of cast iron, and possess inherent resiliency tending to expand. The thin sections are made preferably of alloy steel, as it is easier to make the thin sections of steel than of iron. Furthermore, making the thin sections of steel gives them spring characteristics so that the thin sections respond very readily to the action of the expanders and follow closely out-of-round or worn cylinder walls. Where the cylinder walls are out of round, and a plurality of thin sections are utilized in a composite ring in the present invention, the rings move back and forth, relatively to one another, transversely of the pistons, in use thereby assuring at all times a tight and efficient oil seal between the piston and the cylinder walls thus preventing oil pumping and smoke. The plurality of thin sections afford additional scraping surfaces so that any excess oil that there may be on a cylinder wall is picked up by these sections.

In installing the rings of the present invention, the gaps are staggered, to prevent blow by and thus increase the efficiency of any internal engine in which the rings may be installed.

Utilization of compression rings employing thick sections, in the first groove of a piston, prolongs the life of the composite piston, as the thick section of iron, resists the heat of combustion and the thin sections, below the thick section, very readily conform to the out-of-round condition of the cylinder walls and thus effect a tight seal between the piston and cylinder at the upper end of the piston.

By utilizing a plurality of thin sections, more scraping edges are provided thereby tending to efficient operation of internal combustion engines.

Furthermore, by using a plurality of thin sections, transverse movement of the sections, relatively to one another, tends to force the thin sections against the cylinder wall and effect a tight seal between the pistons and cylinder walls irrespective of the out-of-round conditions of the cylinders.

By manufacturing the thick sections as multiples of the thin sections, piston grooves of any axial size, may be readily accommodated so that the dealer need not carry a very large stock of sections, as he would otherwise have to carry if he had a stock of rings manufactured to accommodate the various piston ring grooves which vary in size from $\frac{3}{32}''$, to $\frac{1}{8}''$, to $\frac{5}{32}''$, to $\frac{3}{16}''$, to $\frac{1}{4}''$, in most automotive vehicle engines.

The oil drain rings of the type illustrated in Figures 1 to 7 inclusive, have proved very successful in use and especially so in connection with engines which are notorious as oil pumpers.

The rings shown in Figures 1 to 4, may, instead of being installed with the thick section A against the lower wall of the groove, be installed with the thin sections against the lower wall of the groove, and the thick section inverted and applied against the uppermost of the thin sections.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention as claimed is as follows:

1. A composite piston ring assembly comprising a cast iron ring member having a continuous scraping edge adapted to be positioned flush with the lower land of a ring groove of a piston, upwardly extending integral spacers formed on said ring member and defining oil passages over the scraping edge portion to the interior of the piston groove, a plurality of thin superposed steel ring members supported in axial position by said spacers, and a resilient expander engaging all of said ring members and urging the same outwardly.

2. A composite piston ring assembly comprising a vented cast iron ring member having a continuous scraping edge flush with the lower land of the ring groove of a piston, a plurality of superposed ribbon steel members positioned above the cast iron member, and an expander for urging all of said ring members outwardly, said cast iron member having an axial depth or thickness which is substantially an exact multiple of the axial thickness of one of the steel ring members.

ALBERT P. FALL.